United States Patent
Gustafson

[11] Patent Number: 5,924,036
[45] Date of Patent: Jul. 13, 1999

[54] CODE-DIVISION MULTIPLE-ACCESS CELLULAR SYSTEM EMPLOYING OVERLAID CELLS

[75] Inventor: Warren H. Gustafson, Palm Bay, Fla.

[73] Assignee: AirNet Communications Corp., Melbourne, Fla.

[21] Appl. No.: 08/605,256

[22] Filed: Feb. 13, 1996

[51] Int. Cl.$^6$ .................................................. H04Q 7/36
[52] U.S. Cl. ......................... 455/447; 455/449; 375/200
[58] Field of Search ................................... 455/422, 446, 455/447, 448, 449, 450, 451, 452, 453, 454; 375/200; 370/335, 342

[56] References Cited

U.S. PATENT DOCUMENTS

| 4,144,411 | 3/1979 | Frenkiel ............................... 455/449 X |
| 5,228,053 | 7/1993 | Miller et al. ......................... 375/200 X |
| 5,295,153 | 3/1994 | Gudmundson ....................... 455/422 X |
| 5,381,443 | 1/1995 | Borth et al. ................................. 375/1 |
| 5,459,759 | 10/1995 | Schilling ............................. 455/422 X |
| 5,640,677 | 6/1997 | Karlsson .............................. 455/449 X |

FOREIGN PATENT DOCUMENTS

650543  6/1991  Australia .
0 589 279 A2  3/1993  European Pat. Off. .

OTHER PUBLICATIONS

El–Dolil, Sami A., Wong, Wai–Choong, and Steele, Raymond, "Teletraffic Performance of Highway Microcells with overlay Macrocell," IEEE Journal on Selected Areas in Communications, vol. 7, No. 1, Jan. 1989.

*Primary Examiner*—Wellington Chin
*Assistant Examiner*—Philip J. Sobutka
*Attorney, Agent, or Firm*—Farkas & Manelli PLLC; Russell O. Paige

[57] ABSTRACT

A cellular-telephone base station (12) services a cell (14) that encompasses cells (16 and 18) serviced by other base stations (20 and 22). The base station (12) associated with the overlaid cell (14) communicates with mobile stations within its cell (14) by way of code-division multiple-access (CDMA) channels in a first frequency band. The CDMA channels by which the other base stations (20 and 22) communicate with mobile stations in their respective cells (16 and 18) occupy a second frequency band. Although the two smaller-cell base stations (20 and 22) employ the same frequency band, they are not contiguous, and they are separated enough so that they interfere only negligibly. Consequently, their channel capacities exceed those of conventionally configured CDMA cells of the same bandwidth.

4 Claims, 3 Drawing Sheets

CODE-DIVISION MULTIPLE-ACCESS CELLULAR SYSTEM EMPLOYING OVERLAID CELLS

BACKGROUND OF THE INVENTION

The present invention is directed to code-division multiple-access cellular-communication systems. It particularly concerns the arrangement of cells used to implement such systems.

It has been recognized that a code-division multiple-access approach to providing cellular communications affords significant advantages over competing approaches. The advantages largely concern system capacity. In conventional approaches, the system resources, such as frequency or time slots or both, are disjoint and tend not to be used efficiently. For instance, although a given conventional cellular system may employ a relatively large number of frequencies to provide different channels, the need to avoid interference between adjacent cells means that the channel frequencies employed in one cell cannot as a practical matter be employed in an adjacent cell. So systems that can employ only one-seventh of the allocated bandwidth in any given cell are not uncommon. Also, conversational dead passages usually command just as much of such systems' capacities as active passages do; to take advantage of such dead passages would require fast switching, detection of the dead spaces, and rapid allocation to other users, all of which are difficult from a practical standpoint.

Code-division multiple-access (CDMA) systems suffer much less from these constraints. The typical code-division multiple-access (CDMA) system employs a common frequency band for all channels, the distinction among channels being the code. A CDMA transmitter uses a pseudo-random spreading code to spread a given channel's energy throughout the CDMA frequency band so that the result appears to be bandlimited white noise. A CDMA receiver applies a reverse, despreading code to the wide common frequency band. This compresses the channel of interest's (broadband) contribution into a narrow band in which the signal can be detected. Other channels are similarly transmitted but with different codes, so a given channel's receiver just respreads the contributions from other channels, which remain wideband noise.

This noise imposes the only limit to the number of CDMA channels in a given frequency band; the number of possible codes is typically large enough not to limit system capacity. Since the major limiting factor is the total power received from the other channels, the system can readily take advantage of conversational dead time by employing a modulation scheme in which dead time requires little or no transmission power. More important, the large number of possible spreading codes means that all channels in adjacent cells interfere only as noise, so all cells can use the entire allocated spectrum. Because of these advantages, a CDMA system theoretically provides many time as much capacity as non-CDMA systems of the same bandwidth.

SUMMARY OF THE INVENTION

Although CDMA systems' high capacities theoretically result largely from adjacent cells' use of the same frequency band, I have devised a way to increase such systems' capacities in a wide variety of practical situations by actually departing selectively from this pattern. Specifically, I have found that in an overlaid cell structure—i.e., in a structure in which a "microcell" is formed in a high-traffic subregion of a larger, lower-average-traffic cell—the use of different frequency bands for the microcell and the over-laid larger cell can actually yield better performance than the conventional CDMA cell organization.

BRIEF DESCRIPTION OF THE DRAWINGS

These and further features and advantages of the present invention are described below in connection with the accompanying drawings, in which.

DETAILED DESCRIPTION OF ILLUSTRATIVE EMBODIMENTS

Figure 1:
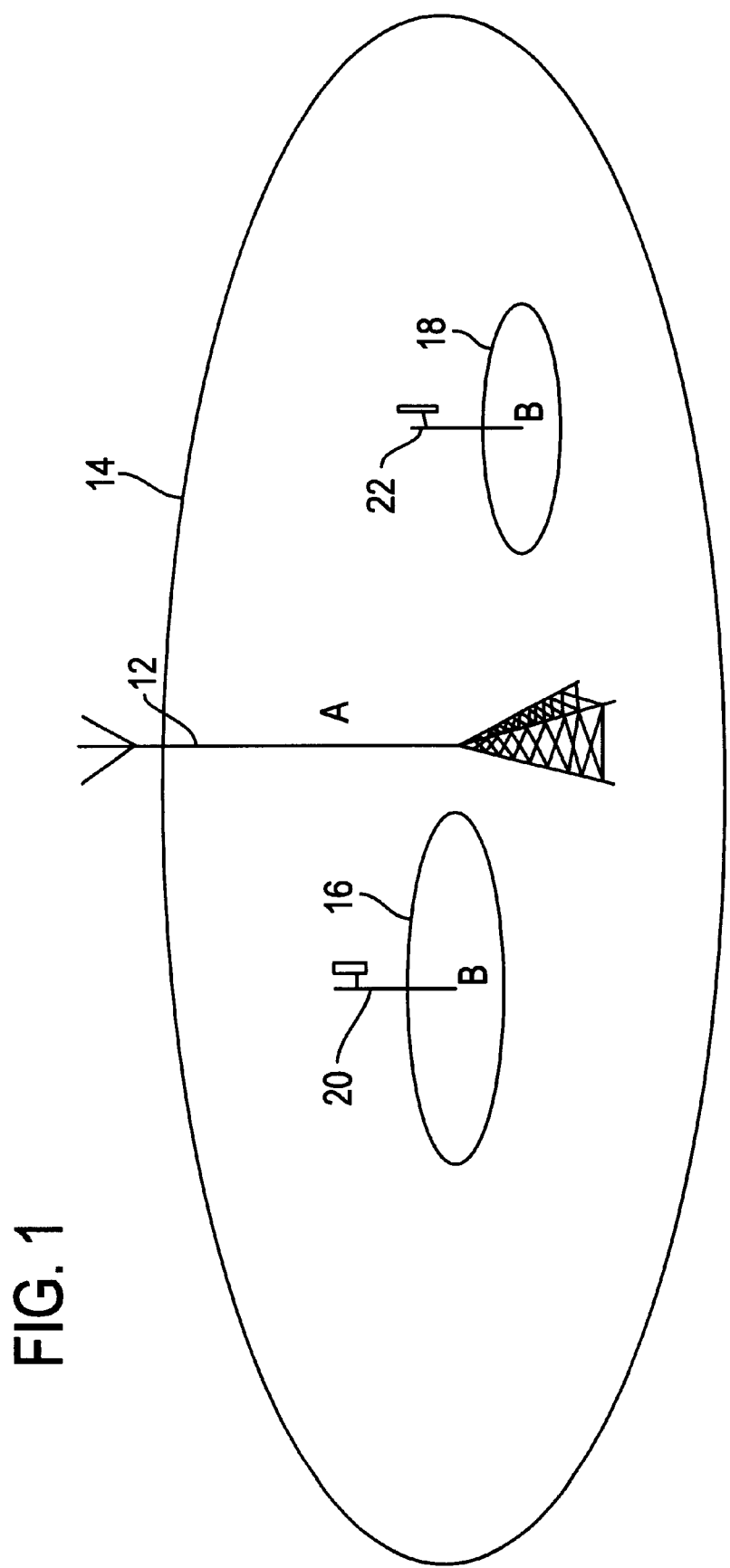
FIG. 1 is a simplified isometric view of a cellular-communication cell organization in which the teachings of the present invention are employed.

In FIG. 1, a cellular base station 12 is depicted as servicing a cellular communications cell 14. That is, it communicates wirelessly with mobile stations within cell 14 so as to link those mobile stations to the larger public communications network (not shown). Following the approach most widely recognized to be advantageous, base station 12 and adjacent (not shown) cells' base stations employ the same frequency band, the different channels being distinguished by different spreading codes rather than different frequencies or time slots (although a CDMA channel can itself be time-division multiplexed).

But in addition to cell 14 and the not-shown cells of the same frequency, which we can call "first-level" cells, the illustrated system includes "second-level" cells 16 and 18 encompassed by cell 14. Second-level cells would normally include high-user-concentration regions, such as shopping malls and toll plazas, within an otherwise lower-density region. According to the present invention, smaller-power base stations 20 and 22 service the smaller cells 16 and 18 and employ a different frequency band. So rather than employ the entire allocated frequency band, for instance, for cell 14, the illustrated system splits the spectrum into bands A and B. The higher-power base station 12 communicates by way of band A, while the two lower-power base stations 20 and 22 communicate by way of band B.

Figure 2:
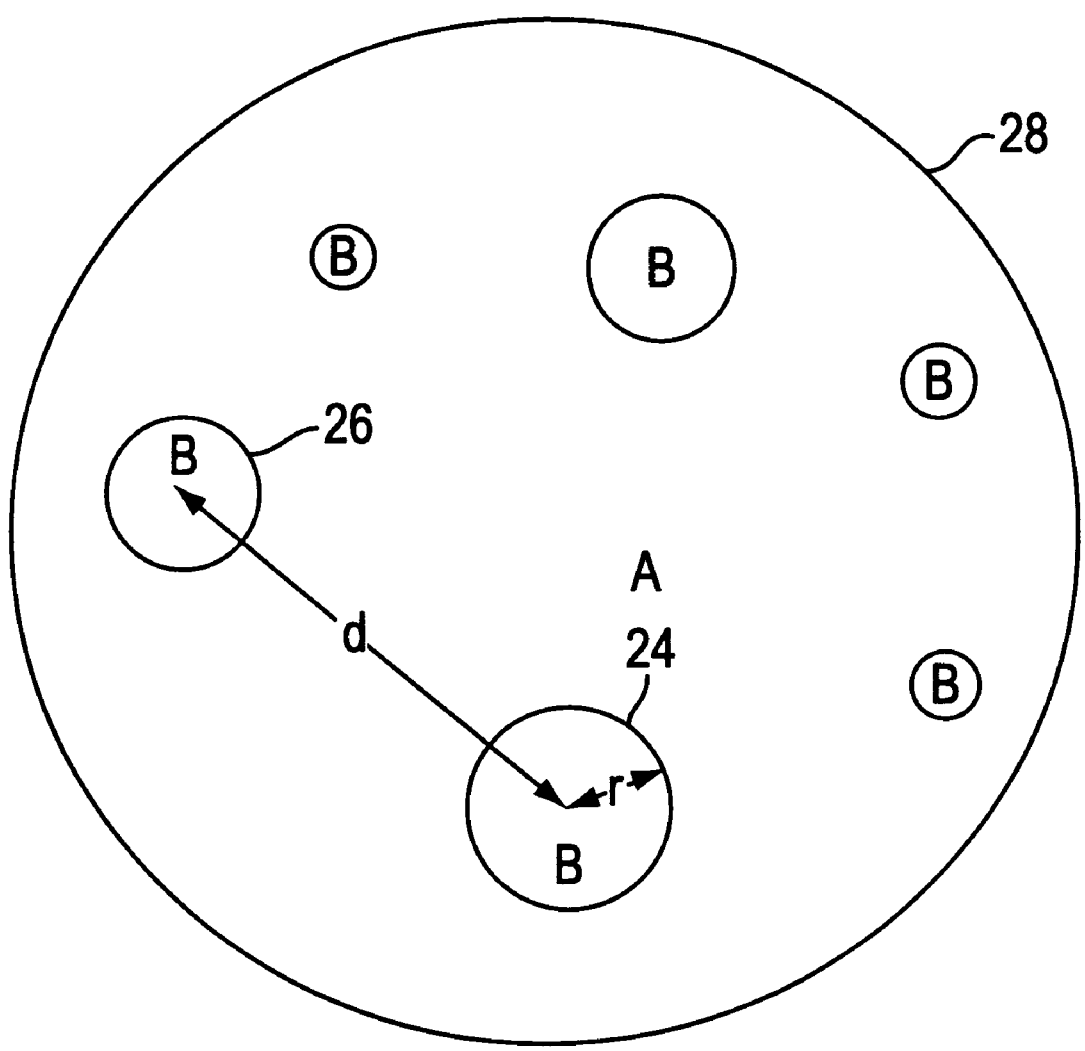
FIG. 2 is a plan view of another cell organization that employs the teachings of the present invention.

Each of the lower-power base stations has its total radiated power so limited as to maximize the number of channels that can be used concurrently, as FIG. 2 illustrates by a cellular organization in which the larger-power cell overlies several smaller cells. In contrast to conventionally organized CDMA cells, the smaller cells are arranged so that each interferes only negligibly with other same-frequency cells. The base station that services cell 24, for instance, so limits its total power that cell 24 extends only to a radius r when it services a full complement of users; its region is not tangent to adjacent same-frequency cell 26, and the full-capacity radius r is kept below such a fraction of the distance d between them that interference is negligible. The limit applied to this ratio r/d that yields acceptable performance is a matter of judgment and will differ for different situations, but I prefer to keep that ratio below a value of 20/49.

In a large number of practical situations, this approach yields the needed capacity more efficiently than a conventional CDMA organization does. This can be appreciated by considering the capacity that the FIG. 2 arrangement can afford. Let us assume that the normal capacity of the spectrum allocated to CDMA signaling is 100 users in the normal CDMA-cell arrangement of contiguous same-frequency-band cells. Then, consider a 10-km$_2$ region in which the user density reaches 1000 users/km$^2$. In the conventional approach, the region would require 100 cells. And this is indeed the optimum organization if the user density is uniform.

But in many situations, high-density pockets are sprinkled around much-lower-density regions. Although a 10-km$^2$ region's density may reach 1000 users/km$^2$, it may actually have a total of only, say, 500 users, because the high-density regions are isolated. In such a situation, the arrangement of FIG. 2 is much more efficient. It covers the entire 500-user region with a single first-level cell 28 that encompasses isolated second-level cells.

The second-level cells' base stations need only radiate enough power to encompass the locally dense regions, and the second-level cells do not need to be contiguous, since the first-level cell services the areas between them. A result of this feature is that each second-level cell can have greater capacity for a given bandwidth. Even though each base station covers only half of the allocated 100-user spectrum, a second-level cell may actually be able to support seventy-five users rather than only fifty, because the interference from other, same-frequency stations is negligible. As a result, the six low-powered transmitters, each of which has a capacity of seventy-five users, and the high-powered transmitter, which has a capacity of fifty, can together service the 500 users that the system must support in cell 28's region.

Figure 3:
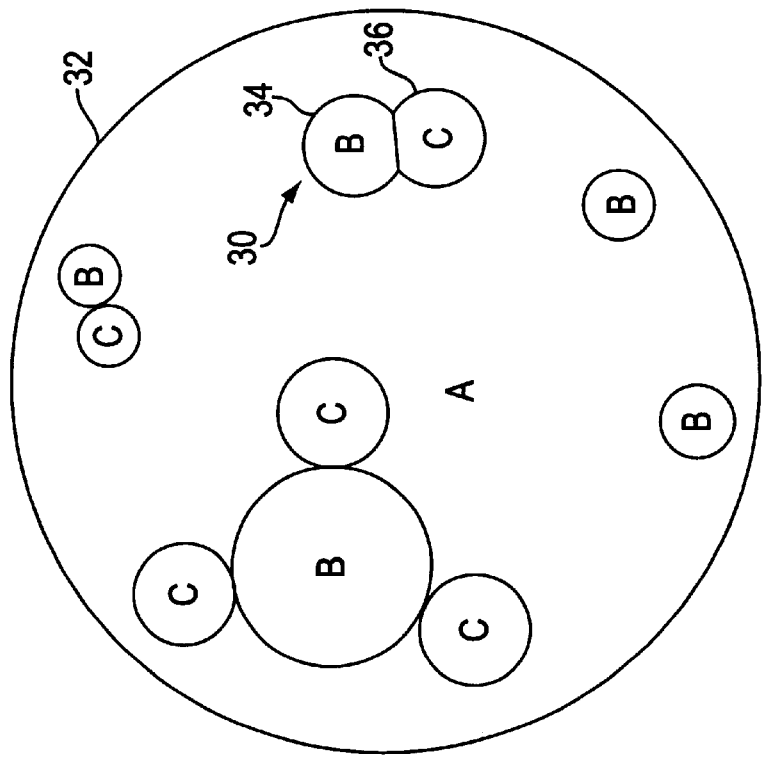
FIG. 3 is a plan view of a further cell organization that can be used in practicing the present invention.

The advantages that result from maintaining a distance between same-frequency cells can be obtained even if a compact subregion must be provided with more capacity than a single frequency band affords, as can be understood by reviewing FIG. 3. In FIG. 3, there is a region 30 within a larger cell 32 that must be provided with capacity for, say, eighty users. This number exceeds the seventh-five-user capacity of a half-spectrum cell. But the overall frequency spectrum is divided into three bands A, B, and C in the arrangement of FIG. 3, and region 30 is serviced by different-frequency base stations, which respectively service cells 34 and 36. Although regions 34 and 36 are contiguous, their frequency bands are different, so they do not interfere with each other. So instead of having only the thirty-three-user capacity (100÷3=33 ⅓) that would result from conventional reuse patterns, each cell has a capacity of fifty; together they provide more than the eighty-user capacity that region 30 requires.

Figure 4:
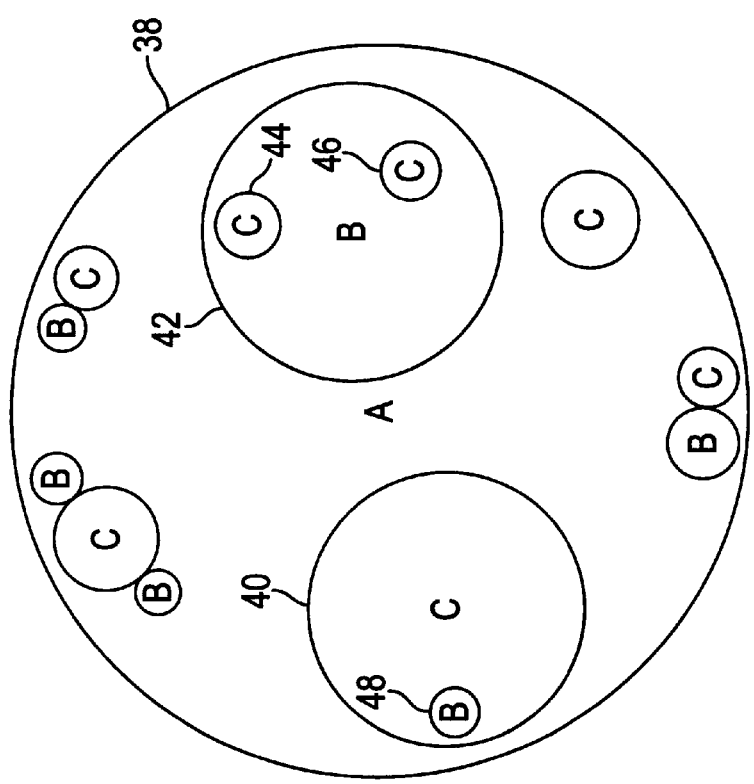
FIG. 4 is yet another cell organization in which the present invention can be employed advantageously.

Indeed, the present invention's teachings can be extended to more than two layers and thereby provide even greater flexibility. In FIG. 4, for instance, a first-level cell 38 overlies ten second-layer cells, two of which, namely, cells 40 and 42, themselves overlie third-layer cells 44, 46, and 48. In FIG. 4, cells 40 and 42 operate at different frequencies because the r/d ratio is too high for them to use the same frequency without a reduction toward conventional-reuse-pattern capacity. Yet cell 40's included cell 48, which employs the same band as cell 42, may be able to employ the maximum, no-interference capacity since it is in a more-remote part of cell 40.

From the foregoing description, it is apparent that the teachings of the present invention can be employed in a wide range of embodiments, and the invention thus constitutes a significant advance in the art.

What is claimed is:

1. In a cellular-telephone system comprising at least one first-level cell and a plurality of second-level cells, in which base stations associated with respective cells link the public telephone network to mobile stations in their associated cells by wireless communication through code-division multiple-access channels in respective frequency bands, the improvement wherein:

A) the cell associated with a first-level one of the base stations encompasses the cell associated with a first second-level one of the base stations;

B) the cell associated with the first second-level one of the base stations has a higher average user concentration than the average user concentration of the cell associated with the first-level one of the base stations;

C) the frequency bands occupied by the code-division multiple-access channels employed by the first-and second-level base stations differ; and (D) the frequency bands occupied by the code-division multiple-access channels employed by a first pair of said plurality of second-level cells are the same; and (E) each of the base stations associated with said first pair of said plurality of second-level cells transmits to its associated second-level cell a radius r from said associated base station, said first pair of base stations separated by a distance d, such that r/d is no greater than 20/49.

2. A cellular-telephone system as defined in claim 1 wherein the cell associated with the first-level base station encompasses the cell associated with a second second-level one of the base stations.

3. A cellular-telephone system as defined in claim 2 wherein the frequency bands occupied by the code-division multiple-access channels employed by the first and second second-level base stations differ.

4. A cellular-telephone system as defined in claim 2 wherein the cell associated with the first second-level base station is not contiguous with the cell associated with any base station that employs code-division multiple-access channels in the same frequency band.

\* \* \* \* \*